United States Patent Office 3,840,637
Patented Oct. 8, 1974

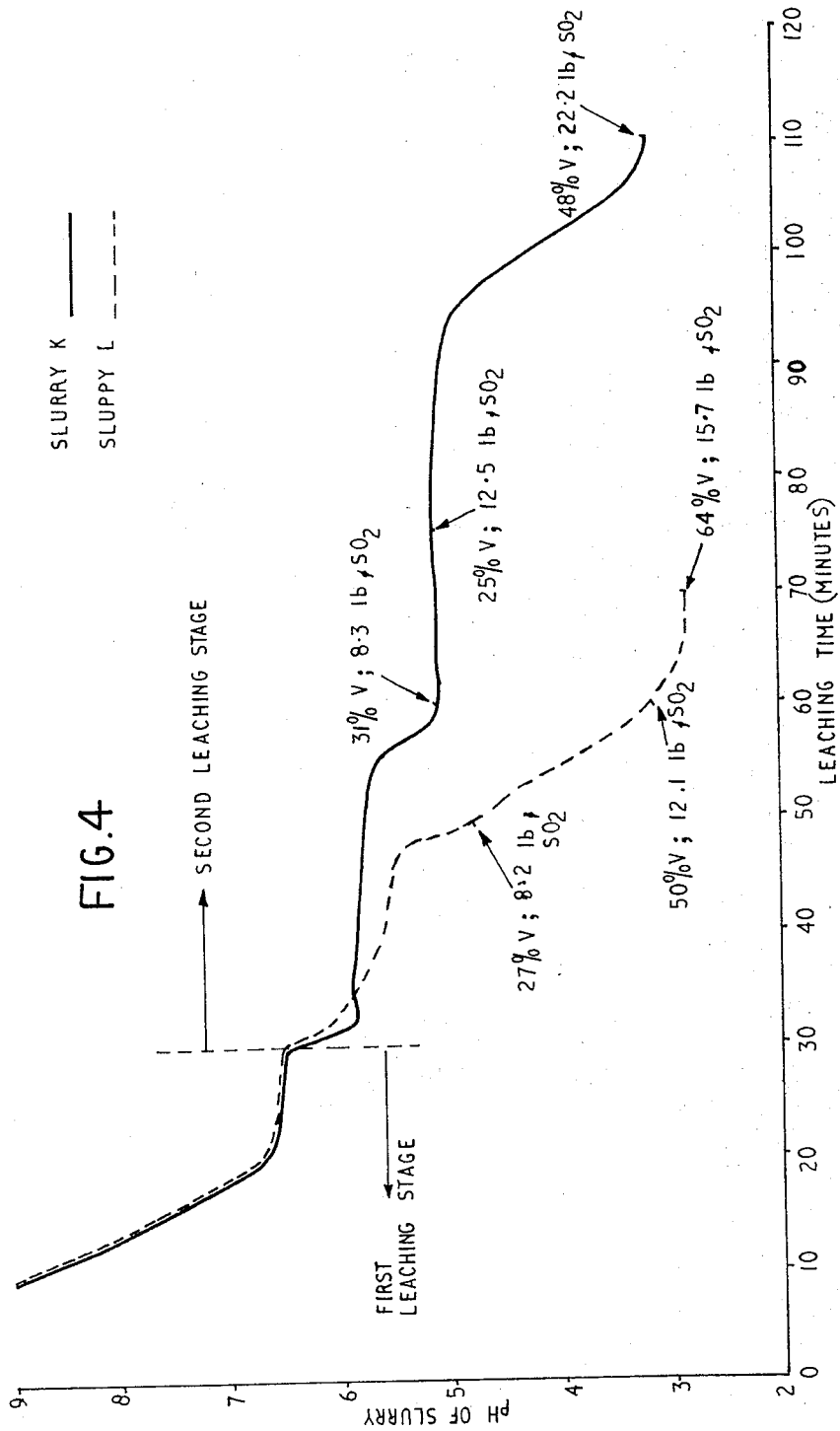

3,840,637
PROCESS FOR RECOVERING VANADIUM VALUES
Bruce Alfred Hardwick and John Howard Patterson, East Roseville, New South Wales, Australia, assignors to The Oil Shale Corporation (Australia), Brisbane, Queensland, Australia
Filed Sept. 15, 1972, Ser. No. 289,469
Claims priority, application Australia, Sept. 20, 1971, 6,345/71
Int. Cl. C01g 31/00
U.S. Cl. 423—68
8 Claims

ABSTRACT OF THE DISCLOSURE

Method of recovering acid leachable vanadium values from vanadiferous ores comprising a high content of calcium carbonate. The ore is first roasted to an ash under conditions selected to minimise the decomposition of the calcium carbonate component to free lime, and vanadium values are then leached from an aqueous slurry of the ash by means of an acid gas. The method is characterized particularly by using an acid gas comprising sulphur dioxide to effect pH reduction in the range below about 6, and various parameters (for example, concentration of sulphur dioxide in the acid gas and temperature of slurry) are controlled whereby to favour incomplete reaction with the calcium carbonate component of the ash. The final leaching system (of pH preferably between about 4 and about 2) is not at equilibrium, and is filtered immediately for maximum recovery of vanadium.

---

This invention relates generally to the recovery of acid leachable vanadium values from vanadiferous ores comprising a high content of calcium carbonate. The invention has particular relevance to the recovery of vanadium from vanadiferous oil shales comprising a low content of vanadium and a high content of calcium carbonate.

The invention owes its origin to difficulties encountered when seeking to provide an economic method of recovering vanadium from the low grade vanadiferous oil shale deposits at Julia Creek in Queensland.

These oil shale deposits comprise a low content of vanadium (about 0.3% V) and a high content of calcium carbonate (up to 50%), together with kerogen (up to 20%), quartz (up to 25%), pyrite (up to 5%), and traces of micas and clays. The vanadium is contained predominantly in a mixed layer montmorillonite/mica type of clay mineral.

According to standard practice for recovering commercially valuable fuel oil from oil shale, the latter is retorted at a temperature between about 400° and about 500° C. under nonoxidative conditions, thus volatilising the oil from its precursor (kerogen), forming hydrogen sulphide from sulphides present (for example, pyrite), and leaving a residue of spent shale. In the case of Julia Creek oil shale, the vanadium fraction after retorting is found to have remained in the spent shale together with inter alia the calcium carbonate.

Methods have been proposed hitherto for recovering vanadium from vanadiferous ores generally in which the ore is crushed, roasted at a temperature of the order of 800° C., and then leached with a strong mineral acid, typically sulphuric acid. Standard procedures, for example including the step of solvent extraction with di-2-ethyl hexyl phosphoric acid in kerosene, are then available for treating the leach liquors to obtain therefrom the vanadium (typically recovered as $V_2O_5$).

Similarly, it has been found possible to recover vanadium from Julia Creek spent shale by methods including the step of leaching with sulphuric acid. However, because of the combination in this spent shale of a quite low content of vanadium and an unusually high content of acid reactive calcium carbonate, it has been found that the requirement of leaching agent needed for a given vanadium recovery is so high as to render the total process uneconomic.

It is an object generally of the present invention to provide an economic method of recovering acid leachable vanadium values from vanadiferous ores comprising a high content of calcium carbonate.

It is a more particular object of the invention to provide an economic method of recovering vanadium from low grade vanadiferous oil shales having a high content of calcium carbonate.

In the course of our experiments leading up to the invention, there has been an extensive investigation into the various parameters relevant both to the preparation of spent oil shale for leaching and to the process of leaching with different acidic reagent systems. So far as the latter aspect of the investigation is concerned, two contrasting acidic reagent systems have been studied in detail, viz. (i) strong mineral acid, exemplified by sulphuric acid; and (ii) acid gas/water, exemplified both by sulphur dioxide/water and carbon dioxide/water. Relevant observations arising from this investigation are given hereunder.

1. Without further treatment, viz. roasting at a temperature typically above 500° C., the vanadium present in spent oil shale is found to be not easily accessible to acid leaching, and this obtains regardless of whether the acidic reagent is an acid gas/water system (for example, sulphur dioxide/water) or a strong mineral acid (for example, sulphuric acid).

2. When a spent shale containing calcium carbonate is roasted at a temperature approaching 800° C., the process is inherently liable to transform the calcium carbonate into highly acid reactive free lime with evolution of carbon dioxide. While this decomposition can be reduced by increasing the partial pressure of environmental carbon dioxide, it cannot be entirely suppressed.

3. When a roasted spent shale (hereinafter termed "shale ash" or "ash") is leached with an acid gas/water system (for example, sulphur dioxide/water), the maximum degree of vanadium recovery that can be achieved is found to be directly dependent on the temperature of roasting up to about 770° C.: however, the requirement of acid gas for leaching a given percentage of vanadium from the ash is variable, being directly dependent on the free lime content thereof as assayed by the standard "sucrose method."

4. When a shale ash is leached instead with a strong mineral acid (for example, sulphuric acid), the requirement of acid for leaching a given percentage of vanadium therefrom is invariably high, being not affected by variations in the proportion of assayed free lime to calcium carbonate therein.

5. When a shale ash is leached with a strong mineral acid or an acid gas/water system, the maximum degree of vanadium recovery that can be achieved is found to be inversely dependent on the final pH of the leaching solution. Thus, the vanadium recovery is generally inadequate (for example, 35%) at a final solution pH within the range about 6 to about 5, but is satisfactory (for example, 65%) at a final solution pH within the range about 4 to about 2.

6. When a shale ash is leached with an acid gas/water system in which the acid gas comprises carbon dioxide per se, the pH cannot be reduced to a value below about 6 (inadequate for satisfactory vanadium recovery). On the other hand, when a shale ash is leached with a strong mineral acid (for example, sulphuric acid), the pH can certainly be reduced to a value adequate for satisfactory vanadium recovery, but only after reaction has first occurred with all the acid reactive calcium carbonate present. Surprisingly however, it has now been found that when a shale ash is leached with an acid gas/water system in which the acid gas comprises either sulphur dioxide per se or sulphur dioxide in combination with carbon dioxide, a pH for satisfactory vanadium recovery can be achieved in spite of the presence of a significant concentration of still unreacted calcium carbonate. For example, the pH can be reduced to a value within the range about 4 to about 2 with a consumption of sulphur dioxide of the order of one quarter that stoichiometrically required for dissolution of the calcium carbonate present.

The success noted in observation 6 regarding pH reduction by means of sulphur dioxide is outstanding, and would not have been predicted from the known equilibria involving calcium carbonate, sulphur dioxide and water.

As evidence of this, reference is now made to an experiment in which two aqueous slurries, $\underline{A}$ & $\underline{B}$, containing equal amounts of calcium carbonate, were each treated with sulphur dioxide to achieve a final pH of 3.5. The calcium carbonate in slurry $\underline{A}$ was pure analytical reagent, while that in slurry $\underline{B}$ was present as the calcium carbonate component of a sample of Julia Creek shale ash. It was found that the requirement of sulphur dioxide to achieve the mentioned pH was about three times greater in the case of slury $\underline{A}$ than in the case of slurry $\underline{B}$.

It is possible that a factor responsible for the low sulphur dioxide usage in reducing the pH of shale ash slurries is the inhibition of calcium carbonate/sulphur dioxide reactions by inter alia vanadyl ions derived progressively from the ash during leaching. This hypothesis would explain the additional observed fact that the pH of a shale ash slurry first fails to fall below a plateau at pH between about 6.0 and about 5.5 during a lengthy early stage of sulphur dioxide addition (when it must be assumed that reaction with calcium carbonate is not inhibited); but after this lag period, the pH falls responsively to further sulphur dioxide addition.

The present invention has its source in the surprising finding noted above, and provides a method for the economic recovery of acid leachable vanadium values from a vanadiferous ore comprising a high content of calcium carbonate, said method broadly comprising the steps of (i) roasting the ore to an ash;
(ii) forming an aqueous slurry of the ash; and
(iii) leaching vanadium values from the ash by reducing the pH of the aqueous slurry to a final value below 6; characterized in that the pH is reduced by introducing an acid gas to the slurry, the reduction of pH from about 6 being effected by a said acid gas comprising sulphur dioxide.

Preferably, the pH of the aqueous slurry is reduced to a final value within the range about 4 to about 2.

When applied to a vanadiferous ore consisting of an oil shale, the method normally also includes the preliminary step of preparing a spent shale by retorting the oil shale to volatilise the oil substantially completely therefrom.

It can be seen from the relevant observations above that the problem of implementing the invention in such a way as to optimise the economic recovery of vanadium from spent shale can be resolved into two aspects, viz.

(i) balancing the conflicting requirements of roasting in such a way as to minimise free lime formation while enabling subsequent maximum vanadium recovery; and
(ii) balacing the further conflicting requirements of leaching the resulting ash in such a way as to minimise the usage of sulphur dioxide while reducing the pH to a sufficiently low value for satisfactory vanadium recovery.

So far as the first aspect of the problem is concerned, it has been found possible conveniently to reduce the decomposition of calcium carbonate into free lime by providing in the roasting step an environmental partial pressure of carbon dioxide greater than the partial pressure of carbon dioxide when at equilibrium with calcium carbonate at the selected roasting temperature. This increased partial pressure is achieved preferably by controlling the combustion of the residual organic content of the spent shale in such a way as to generate therefrom a sufficient supply of carbon dioxide; and, to facilitate carrying out this measure, preferably the roasting step is conducted in a fluidised bed. In the case of Julia Creek material, it is possible in this way substantially to prevent free lime formation even when roasting at temperatures up to about 800° C.

So far as the second aspect of the problem in concerned, it has been found that the sulphur dioxide requirement for a given vanadium recovery can be reduced inter alia by appropriately controlling a number of parameters, particularly in the pH sub-range about 6 to about 4.5. Parameters of principal importance are: (a) the composition of the acid gas used; (b) the concentration of sulphur dioxide in the acid gas; (c) the temperature of the slurry; and (d) the rate of sulphur dioxide input to the slurry. These features are now discussed in turn and are illustrated subsequently in various of the numbered Examples and appended drawings.

Regarding firstly the feature of gas composition, it has been found for example that the overall sulphur dioxide requirement for a given vanadium recovery is increased if the acid gas used for leaching comprises sulphur dioxide in admixture only with oxygen and/or nitrogen. On the other hand, the overall sulphur dioxide requirement for a given vanadium recovery is not increased if the acid gas used for leaching comprises sulphur dioxide in combination only with carbon dixoide, and this obtains regardless of whether the two gases are employed sequentially (as suggested below) or in continuous admixture. More surprisingly, a similarly favourable result is also obtained if the acid gas used for leaching comprises sulphur dioxide in admixture with carbon dioxide, nitrogen and oxygen—such as the mixture of gases typically found in various industrial gases. This feature is illustrated in Example 1 subsequently given herein.

Having regard to the ready availability of carbon dioxide as further explained below, it has been found desirable according to one embodiment of the invention to reduce the pH of the slurry in two stages, the pH first being reduced as far as possible (to pH between about 6.5 and about 6.0) by adding thereto a gas comprising carbon dioxide as the only acidic component, and then being reduced to the required final value by adding thereto sulphur dioxide.

When the invention is applied to Julia Creek oil shale in the embodiments involving the use of both sulphur dioxide and carbon dioxide, it is a particular advantage that both these gases can be obtained—either indirectly or directly—from waste gases naturally produced in the treatment of the oil shale by retorting and roasting. Thus, sulphur dioxide can be obtained from a catalysed oxidation of waste hydrogen sulphide produced in the retorting step, and carbon dioxide is the main acidic component of waste flue gas from the roasting step. In addition, carbon dioxide is a by-product of leaching with sulphur dioxide at pH between about 6.0 and about 4.5, and this by-product gas can be used conveniently for leaching in the first stage.

In the case of Julia Creek oil shale—for a moderately high vanadium recovery (up to about 50%)—the availability of these gases from waste sources is sufficient without augmentation to meet the requirement for acid gas reagent in the leaching process of the invention. The economic merit of such a deployment of waste materials is obvious.

It has been shown that there is a tendency for two characteristic pH plateaus to be formed within the pH subject range about 6.0 to about 4.5, the first such plateau having a tendency to occur generally within the pH sub-range about 6.0 to about 5.5 and the second such plateau having a tendency to occur generally within the pH sub-range about 5.5 to about 4.5.

In the case of ashes containing a relatively high content of free lime (for example, ashes obtained by roasting near 800° C.), the occurrence of the first plateau has been shown to be unavoidable, but the prolongation of the plateau beyond a certain point has been inferred to be avoidable. However, in the case of ashes containing a relatively low content of free lime (for example, ashes obtained by roasting at about 600° C.), the occurrence of this plateau has been shown to be avoidable. The occurrence of the second such plateau has been shown to be invariably avoidable.

Since plateaus are always associated with usage of sulphur dioxide for purposes other than reduction of pH (for example, they are associated with the dissolution of calcium carbonate or free lime), it is clearly desirable to avoid them completely or—at least—to avoid their unnecessary prolongation.

Methods which have been developed to achieve these ends within the pH sub-range about 6 to about 5.5 include the steps if necessary of increasing the concentration of sulphur dioxide in the acid gas and/or lowering the temperature of the slurry.

In practice therefore, the pH of the slurry is preferably monitored continuously for plateau formation during the pH sub-range in question; the progress of the pH is compared continuously with experimentally predetermined optimum patterns; and, if substantial departures from such patterns occur, the remedial measures are then promptly taken.

Typical minimal plateau formation within the pH sub-range about 6 to about 5.5 can be achieved when using a gas mixture having a concentration of sulphur dioxide of as little as about 1% by weight (corresponding to 0.45% by volume) at leaching temperatures up to about 40° C. However, a concentration of sulphur dioxide typically as great as about 8% by weight (corresponding to 3.8% by volume) is needed to achieve a similarly satisfactory result at leaching temperatures of about 60° C. The features of sulphur dioxide concentration and temperature are further illustrated in Example 2 subsequently given herein with reference to FIGS. 1 and 2 of the appended drawings.

Regarding the pH sub-range about 5.5 to about 4.5, it has been shown that plateau formation can be substantially avoided by the simple expedient of ensuring that the rate of sulphur dioxide input to the slurry is sufficiently high.

In order to implement this measure to best economic advantage, the pH of the slurry is again continuously monitored for plateau formation within the pH sub-range in question and the rate of input of sulphur dioxide is increased only when the onset of a pH plateau is detected. This feature of sulphur dioxide input is illustrated in Examples 3 and 4 subsequently given herein with reference respectively to FIGS. 3 and 4 of the appended drawings.

Accordingly, by appropriate control of all these parameters, pH plateau formation can be markedly inhibited within the pH sub-range about 6.0 to about 4.5 and the vanadium recovery for a given sulphur dioxide usage can be correspondingly increased. Moreover, it has been found that if steps are not taken to inhibit pH plateau formation by adequately controlling these parameters, a portion of the vanadium which has already been leached from the ash is progressively precipitated from solution and—for practical purposes—lost from the system.

Additionally, it has been found that, when leaching in the pH sub-range below about 4.5, the pH has a tendency to assume further plateau values corresponding to further substantial periods of sulphur dioxide consumption. While a slightly higher vanadium recovery may be achieved by prolonging the leaching process to the end of such plateaus, the economic advantage of this is offset by the usage of sulphur dioxide and the increased leaching time involved. For this reason, it is again preferred to monitor the pH continuously when leaching in the pH sub-range below about 4.5, and to terminate the leaching process as soon as the pH attains the first sensibly constant value (i.e. plateau) in that sub-range. By such means, the available sulphur dioxide can again be used to best economic advantage. The feature of most expedient termination of leaching is illustrated in Example 5 subsequently given herein.

Termination of leaching when the pH attains the first sensibly constant value below about 4.5 necessarily results in a final leaching system which is not at equilibrium. If this system is allowed to stand, the sulphur dioxide present therein is progessively consumed by dissolution of residual calcium carbonate, the pH rises, and a portion at least of the recovered vanadium is precipitated and effectively lost. According to a preferred embodiment therefore, the leaching system is submitted to filtration immediately after the final pH has been attained. By this means, the calcium carbonate is removed from the vanadium-rich filtrate and the soluble vanadium content can be preserved. The importance of immediate filtration is demonstrated in Example 6 subsequently given herein.

Conveniently, the filtrate is in a condition without further treatment for solvent extraction of the vanadium by for example di-2-ethyl hexyl phosphoric acid in kerosene.

The filtered solids still contain an appreciable quantity of vanadium-rich liquor and are therefore preferably washed to recover the residual extracted vanadium therefrom. Preferably, the wash liquid is selected initially so as to avoid a rise in pH and thus prevent any loss of previously solubilised vanadium. This is achieved conveniently by the use initially of an acidic liquor, such as the raffinate from the above mentioned solvent extraction step. Final washing is carried out with a vanadium-free liquid, such as water per se.

An embodiment of the invention incorporating a number of the previously discussed preferred features is given subsequently in Example 7.

While the invention has been described herein particularly in relation to the recovery of vanadium from low grade vanadiferous oil shales having a high content of calcium carbonate, it will be appreciated that the subject method of leaching is applicable also for recovering vanadium from other vanadiferous ores. For example, the method is applicable to the recovery of vanadium from low grade vanadiferous shales of high calcium carbonate content whose kerogen content has been lost by weathering (the case of surface shale).

The invention is now illustrated with reference to the following numbered Examples and the appended drawings, in which.

Figure 3:
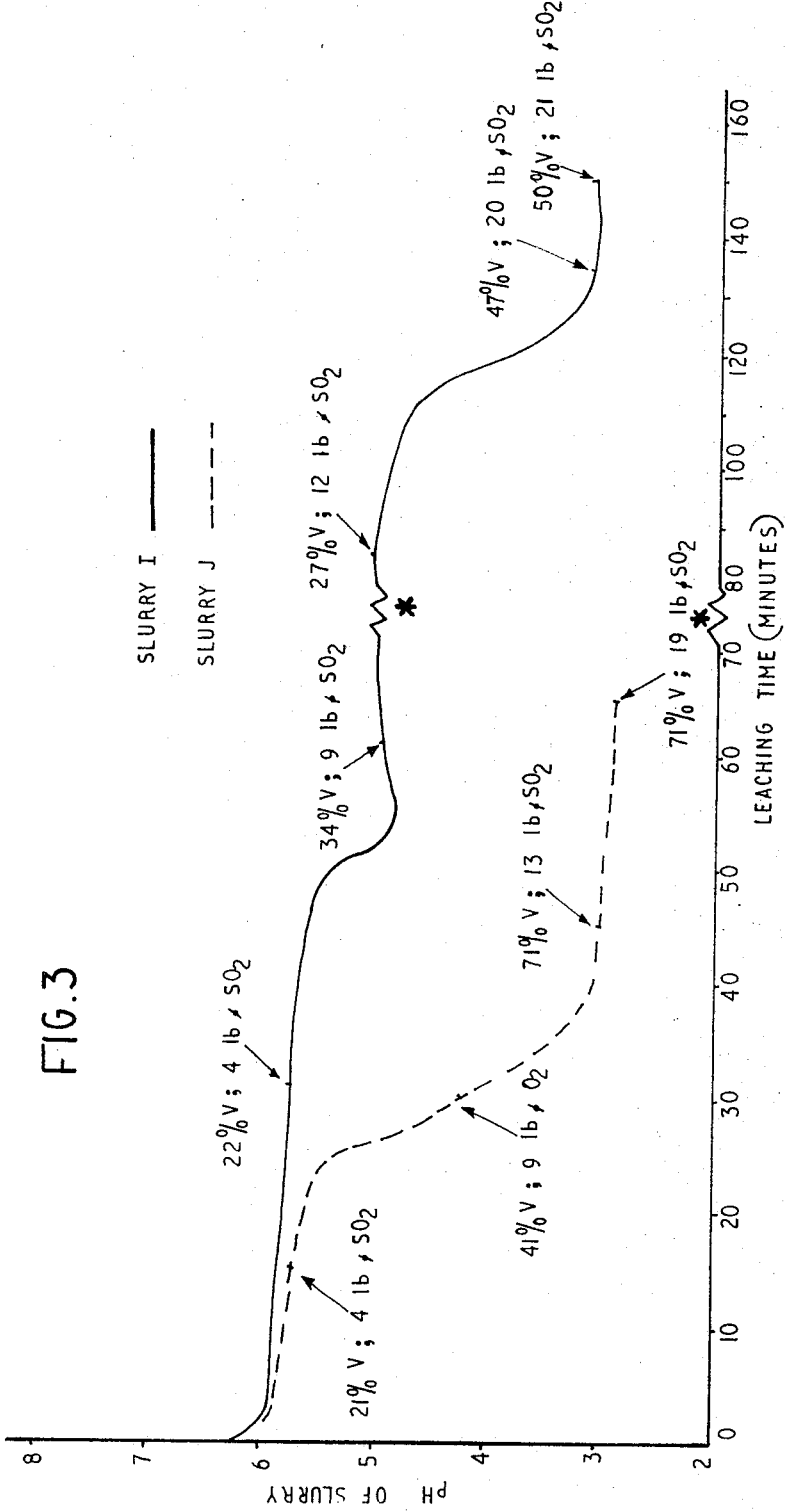

FIG. 3 is a graph showing the variation of pH with time in the case of two slurries of an ash, I and J, leached at 55° C. with an acid gas in the second stage comprising a further different mixture of the same gases, the input rate of sulphur dioxide being less for slurry I than for slurry J; and FIG. 4 is a graph showing the variation of pH with time in the case of two slurries of an ash, K and L, leached at 60° C. with an acid gas in the second stage comprising an again different mixture of the same gases, the concentration of sulphur dioxide therein being less for slurry K than for slurry L, but the total gas flow rates in the two cases being comparable.

Figure 1:
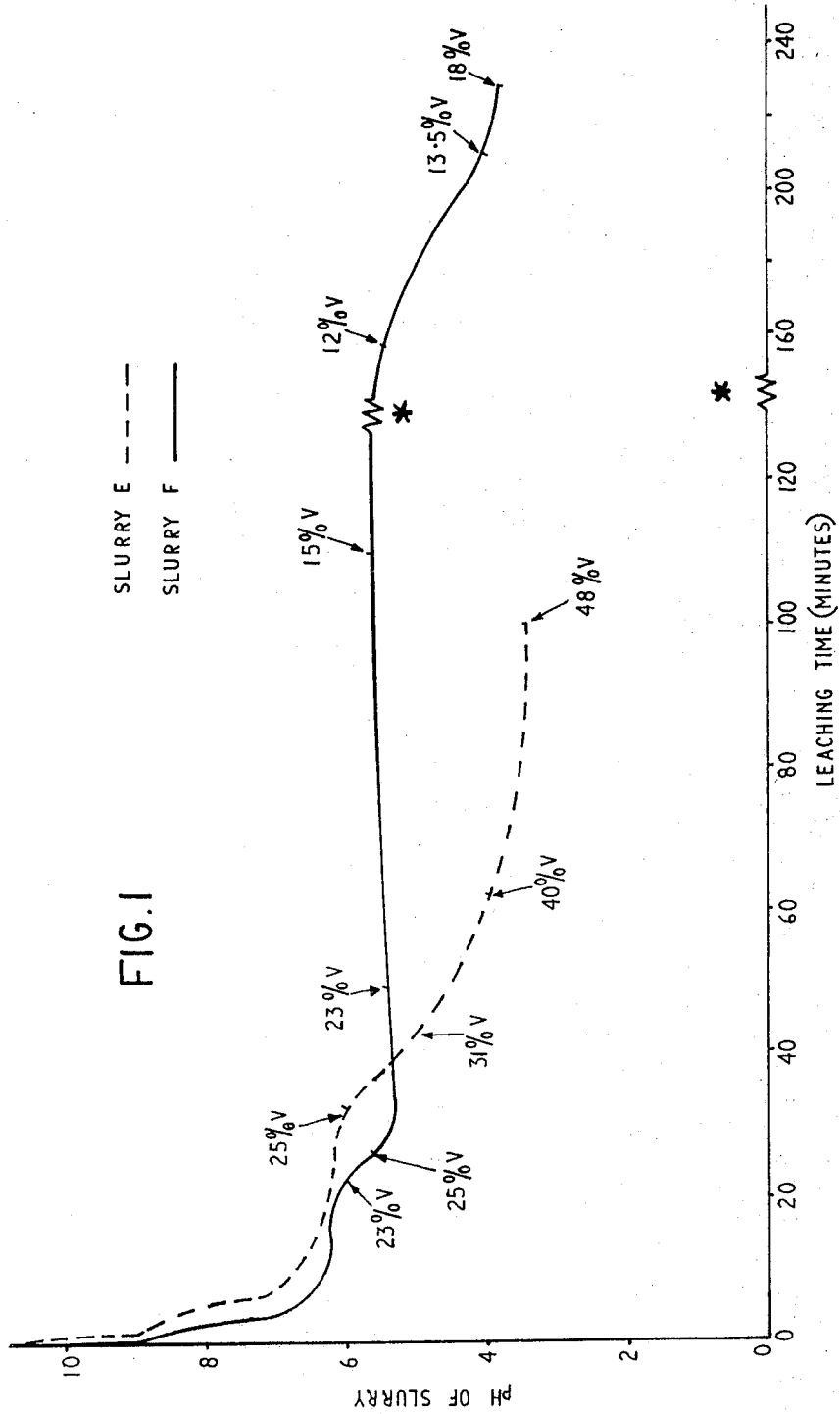
FIG. 1 is a graph showing the variation of pH with time in the case of two slurries of an ash, E and F, leached respectively at 40° C. and 60° C. with an acid gas comprising a mixture of sulphur dioxide (relatively low concentration), carbon dioxide, oxygen and nitrogen.

It will be appreciated that the zig-zag lines (*) in each of FIGS. 1 and 3 are merely for the purpose of signalling a change of scale.

EXAMPLE 1

A sample of spent Julia Creek oil shale was roasted in a fluidised bed at 800° C. and the resulting ash was divided into portions A to D.

Each portion of ash was formed into a corresponding aqueous slurry (20% solids by weight) and the slurry was then leached at 55° C. to a selected final pH below 6 by introducing thereto a selected acid gas.

In the case of slurries A to C, the pH was first lowered to 6.5 (first stage leaching) by introducing thereto a gas comprising carbon dioxide as the only acidic component. The pH was then lowered to the selected final value (second stage leaching) by means of a gas of composition as specified in Table 1 below.

In the case of slurry D, the pH was lowered to the selected final value (single stage leaching) by means of the gas of composition specified in the Table.

At the termination of leaching, the slurry in each case was filtered immediately and washed (uniform procedures being followed); and the filtrate was analysed for vanadium by standard procedures.

The Table records the recovery (percent) of vanadium and the sulphur dioxide input in each case.

TABLE 1

| Slurry | Gas composition (percent by volume) | | | | Final pH | Percent vanadium extracted | $SO_2$ input (lb./100 lb. ash) |
|---|---|---|---|---|---|---|---|
| | $SO_2$ | $CO_2$ | $O_2$ | $N_2$ | | | |
| A | 3.8 | 11.4 | 6.3 | 78.5 | 3.0 | 71 | 13 |
| B | 4.6 | | | 95.4 | 3.1 | 38 | 17 |
| C | 4.8 | | 95.2 | | 3.5 | 33 | 17 |
| D | 7.5 | 92.5 | | | 2.9 | 69 | 13 |

It is apparent from these results that acceptably high vanadium recoveries can be obtained with reasonably low sulphur dioxide inputs when the acid gas used is sulphur dioxide in admixture either with carbon dioxide per se (single stage leaching: case D) or with carbon dioxide, oxygen and nitrogen (two stage leaching: case A). However, the vanadium recoveries are reduced, and the sulphur dioxide inputs are at the same time increased, when the final pH is achieved by means of an acid gas comprising sulphur dioxide in admixture either with oxygen or nitrogen alone.

EXAMPLE 2

A sample of spent Julia Creek oil shale was roasted in a muffle furnace at 600° C. and the resulting ash was divided into portions E to H.

Each portion of ash was formed into a corresponding aqueous slurry (30% solids by weight) and the slurry was then leached at a selected temperature to pH values below 6. The leaching agent was a selected acid gas comprising sulphur dioxide in admixture with carbon dioxide, oxygen and nitrogen. The different leaching temperatures and acid gas compositions are recorded in Table 2 below.

The pH of each slurry was monitored continuously throughout the leaching process. Samples of the slurry were withdrawn from time to time, and these were filtered immediately and analysed for vanadium by standard procedures.

Figure 2:
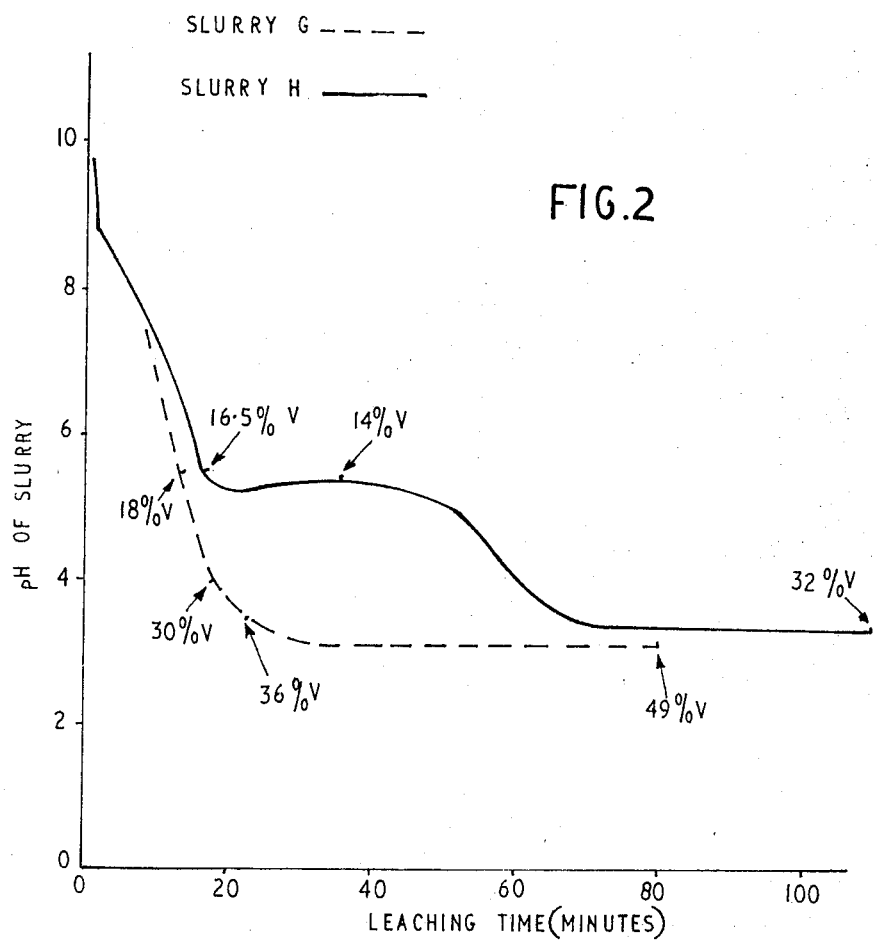
FIG. 2 is a graph showing the variation of pH with time in the case of two slurries of the same ash, G and H, leached respectively at 60° C. and 80° C. with an acid gas comprising a different mixture of the same gases (relatively high concentration of sulphur dioxide)

The variation of pH with time in the case of slurries E and F is shown in the graph of appended FIG. 1, and in the case of slurries G and H is shown in the graph of appended FIG. 2. The recovery (percent) of vanadium in the various samples is recorded at the appropriate points on the graphs, and the total sulphur dioxide input for each slurry (to termination of leaching) is recorded in the Table.

TABLE 2

| Slurry | Leaching temperature (° C.) | Gas composition (percent by volume) | | | | $SO_2$ input (lb./100 lb. ash) |
|---|---|---|---|---|---|---|
| | | $SO_2$ | $CO_2$ | $O_2$ | $N_2$ | |
| E | 40 | 0.45 | 15.4 | 8.7 | 75.4 | 3.1 |
| F | 60 | 0.45 | 15.4 | 8.7 | 75.4 | 7.0 |
| G | 60 | 3.8 | 7.7 | 6.8 | 81.7 | 10.5 |
| H | 80 | 3.8 | 7.7 | 6.8 | 81.7 | 14.6 |

It is apparent from the Table and graphs that:
(i) at a leaching temperature of 40° C., a satisfactory vanadium recovery (48%) can be achieved for a low total input of sulphur dioxide (3.1 lb./100 lb. ash) even when the selected acid gas comprises as little as 0.45% by volume sulphur dioxide (slurry E);
(ii) at a leaching temperature of 60° C. however—other factors remaining constant—vanadium recovery is markedly less satisfactory (a maximum of only 25% is achieved after about 30 minutes, and solubilised vanadium is then apparently lost from solution during the lengthy plateau in the pH sub-range about 6.0 to about 5.5) (slurry F);
(iii) a satisfactory vanadium recovery (49%) can again be achieved at a leaching temperature of 60° C. by increasing the sulphur dioxide concentration to 3.8% by volume (slurry G); but
(iv) vanadium recovery is again markedly reduced if leaching is attempted at 80° C. when using an acid gas comprising 3.8% sulphur dioxide by volume (slurry H).

EXAMPLE 3

A sample of spent Julia Creek oil shale was roasted in a fluidised bed at 800° C. and the resulting ash was divided into portions I and J.

The two portions of ash were formed into corresponding aqueous slurries (20% solids by weight) and these were then leached (two stage process) with the same gas compositions at 55° C.

The leaching agent for the second stage (pH less than 6.3) in both cases consisted of sulphur dioxide in admixture with carbon dioxide, oxygen and nitrogen (respectively: 3.8%, 11.4%, 6.3% and 78.5% by volume); but the rate of input of the sulphur dioxide component was 0.143 lb./100 lb. ash/minute in the case of slurry I, and 0.285 lb./100 lb. ash/minute in the case of slurry J.

As in the case of Example 2, the pH of each slurry was monitored continuously throughout the leaching process, and samples of the slurry were withdrawn from time to time and analysed for vanadium recovery.

The variation of pH with time is shown in the graphs of appended FIG. 3. The recoveries (percent) of vanadium in the various samples, together with the relevant sulphur dioxide inputs (for 100 lb. ash), are recorded at the appropriate points on the graphs.

It is apparent from the graphs that the lengthy plateau in the pH sub-range about 5.5 to about 4.5 (slurry I) can be avoided (as in slurry J), and vanadium recovery can be markedly increased (from 50% for slurry I to 71% for slurry J), by the simple expedient of increasing the rate of sulphur dioxide input. Further, it is apparent that this increase in rate of input does not entail a corresponding increase in total sulphur dioxide input (13 lb. sulphur dioxide for slurry J at a second stage leaching time of 45 minutes compares very favourably with 21 lb. sulphur dioxide for slurry I at a second stage leaching time of 150 minutes).

EXAMPLE 4

A sample of spent Julia Creek oil shale was roasted in a fluidised bed at 770° C. and the resulting ash was divided into portions K and L.

The two portions of ash were formed into corresponding aqueous slurries (about 20% solids by weight), and these were then leached (two stage process) with selected acid gases at about 60° C.

In both cases, first stage leaching was carried out to pH 6.5 with the same acid gas comprising carbon dioxide in admixture with oxygen and nitrogen (respectively: 21.6%, 6.1% and 72.3% by volume); but second stage leaching was then carried out in the two cases with acid gases comprising different concentrations of sulphur dioxide in admixture with carbon dioxide, oxygen and nitrogen at comparable total gas flow rates. Thus, the second stage leaching of slurry K was carried out with an acid gas comprising the mentioned component gases in concentrations respectively: 10.1%, 19.4%, 5.5% and 65.0% by volume; and that of slurry L was carried out with an acid gas comprising these components in concentrations respectively: 16.3%, 18.1%, 5.1% and 60.5% by volume.

As in previous Examples 2 and 3, the pH of the slurries was monitored continuously and samples of the slurries were withdrawn from time to time for determination of vanadium recovery.

The variation of pH with time is shown in the graphs of appended FIG. 4, and the graphs are annotated at appropriate points to indicate vanadium recovery (percent) and sulphur dioxide consumption.

It is apparent from the graphs that the lengthy plateau in the pH sub-range about 5.5 to about 4.5 (slurry K) can be avoided (as in slurry L), and vanadium recovery can be markedly increased (from 48% for slurry K to 64% for slurry L), by the expedient in this Example of increasing the concentration of sulphur dioxide in the acid gas used for leaching. It will be recognised that this procedure represents an alternative embodiment of the method of increasing the rate of sulphur dioxide input (illustrated in Example 3).

EXAMPLE 5

A sample of spent Julia Creek oil shale was roasted in a fluidised bed at 760° C. and the resulting ash was formed into an aqueous slurry (20% solids by weight) (slurry M).

The slurry was then leached at 55° C. in the same manner as described in Example 3 in relation to slurry J.

Again, as in previous Examples 2 to 4, the pH of the slurry was monitored continuously and samples were withdrawn for determination of vanadium recovery.

Table 3 below records the variation of pH with time (measured from the beginning of the second stage), the corresponding sulphur dioxide inputs and consumptions (lb. for 100 lb. ash), and the recoveries (percent) of vanadium.

TABLE 3

| Leaching time | pH | SO₂ input (lb./100 lb.) | SO₂ consumed (lb./100 lb. ash) | Percent vanadium extracted |
| --- | --- | --- | --- | --- |
| 30 minutes | 3.4 | 9 | 9 | 53 |
| 40 minutes | 3.2 | 11.7 | | |
| 45 minutes | 3.1 | 13 | 11 | 66 |
| 86 minutes | 3.0 | 25 | 13 | 66 |

It is apparent from the Table that increasing the leaching time from 45 to 86 minutes has no effect on the vanadium recovery but entails a considerable input of sulphur dioxide. The advantage of terminating the leaching process after 45 minutes (when the pH has attained a sensibly constant value) is therefore apparent.

EXAMPLE 6

A slurry sample was prepared and leached in the manner subsequently described herein for slurry P of Example 7.

Immediately after leaching, a portion of the slurry was withdrawn and filtered to provide a liquor sample (N) for analysis. The remainder of the slurry was stirred during a 20 minute holding period before it also was withdrawn and filtered to provide a liquor sample (O) for analysis.

It was found that the vanadium recovery based on the analysis of sample N was 57.4%, while that based on the analysis of sample O was 48.9%. The advantage of immediate filtration is thus readily apparent.

EXAMPLE 7

A sample of spent Julia Creek oil shale was roasted in a fluidised bed at 770° C. in a gaseous atmosphere comprising about 4% by volume oxygen and about 18% by volume carbon dioxide.

The resulting ash was formed into an aqueous slurry (25% solids by weight) (slurry P), and this was then leached (two stage process) at 60° C. to a suitably low final pH.

First stage leaching to pH about 6 was carried out with an acid gas comprising carbon dioxide in admixture with oxygen and nitrogen (respectively: 28.0%, 6.0% and 66.0% by volume); and second stage leaching was carried out with pure sulphur dioxide (input rate of 0.41 lb./100 lb. ash/minute).

The pH was monitored continuously for possible plateau formation within the various pH sub-ranges, but no avoidable plateau was detected (i.e. the only detected plateau onset occurred in the pH sub-range below about 4.5).

Samples of the slurry were withdrawn from time to time for analysis of vanadium recovery and determination of the sulphur dioxide consumed.

Leaching was terminated as soon as the pH attained a sensibly constant value in the sub-range below about 4.5. The leaching system was then immediately filtered, and the filter cake was washed first with raffinate from a solvent extraction step (using the extractant previously mentioned herein), and then with water.

Vanadium recoveries determined from two samples (a) and (b) taken just prior to the termination of leaching, as well as from sample (c) the filtrate and washings, are recorded in Table 4 below. The Table also gives the relevant sulphur dioxide usage.

TABLE 4

| Sample | pH | SO₂ consumed (lb./100 lb. ash) | Percent vanadium extracted |
| --- | --- | --- | --- |
| (a) | 2.5 | 7.7 | 57 |
| (b) | 2.3 | 12.0 | 67 |
| (c) | | 12.0 | 68 |

Chemical analysis of the washed and leached residues showed that only 15% of calcium carbonate originally present in the ash was dissolved in the leaching process.

It was also assessed that, if the same ash had been leached with sulphuric acid, the consumption of the reagent for a vanadium recovery of about 90% would have been about 97 lb./100 lb. ash (corresponding, on a molar basis, to a sulphur dioxide usage of 63 lb.). It is apparent therefore that the method of leaching according to the invention enables substantial economies to be achieved.

What is claimed is:

1. In a method of recovering acid leachable vanadium values from vanadiferous oil shale having a high content of calcium carbonate comprising the steps of: (a) retorting said shale at a temperature between about 400° C. and about 500° C. to volatilize the oil substantially completely therefrom and to form spent shale having a residual organic content and containing said calcium carbonate and vanadium values, (b) roasting the spent shale at a temperature between about 500° C. and about 800° C. to combust the residual organic content and to form shale ash containing said calcium carbonate and vanadium values, (c) forming an aqueous slurry of the shale ash, and (d) leaching the vanadium values from the shale ash by reducing the pH of the aqueous slurry to a final value below 6; the improvement which comprises said reduction to a final pH value below 6 being effected by introducing into the aqueous slurry as an acid gas sulfur dioxide and carbon dioxide or sulfur dioxide, carbon dioxide, nitrogen and oxygen, whereby said vanadium values are leached from the shale ash without dissolving a substantial amount of the calcium carbonate.

2. The method as defined by claim 1 wherein the pH of the aqueous slurry in the leaching step is first reduced to a value within the range of about 6.5 to about 6 by introducing therein carbon dioxide or a mixture of carbon dioxide, nitrogen and oxygen and is then reduced to the final pH value below 6 by further introducing therein sulfur dioxide.

3. The method as defined by claim 1 wherein the pH of the aqueous slurry in the leaching step is reduced to a final pH value below 6 by introducing therein an acid gas mixture of sulfur dioxide and carbon dioxide or of sulfur dioxide, carbon dioxide, nitrogen and oxygen.

4. The method as defined by claim 1 wherein said aqueous slurry is reduced to a final pH value within the range of about 4 to about 2.

5. The method as defined by claim 1 wherein the pH of the aqueous slurry in the leaching step is continuously monitored for formation of a pH plateau or constant pH value within a first pH subrange of about 6 to about 5.5 and the concentration of sulfur dioxide in the acid gas introduced is then increased upon the occurrence of such a pH plateau, whereby the usage of sulfur dioxide is minimized.

6. The method as defined by claim 1 wherein the pH of the aqueous slurry in the leaching step is continuously monitored for formation of a pH plateau or constant pH value within a first pH subrange of about 6 to about 5.5 and the temperature of the aqueous slurry is then decreased upon the occurrence of such a pH plateau, whereby the usage of sulfur dioxide is minimized.

7. The method as defined by claim 1 wherein the pH of the aqueous slurry in the leaching step is continuously monitored for formation of a pH plateau or constant pH value within a second pH subrange of about 5.5 to about 4.5 and the rate of input of sulfur dioxide thereto is then increased upon the occurrence of such a pH plateau, whereby the usage of sulfur dioxide is minimized.

8. The method as defined by claim 1 wherein the pH of the aqueous slurry in the leaching step is continuously monitored for formation of a pH plateau or constant pH value within a third pH subrange below about 4.5, the input of said acid gas to the aqueous slurry is then terminated upon the occurrence of such a pH plateau and the slurry is then immediately filtered.

References Cited
UNITED STATES PATENTS

| | | | |
|---|---|---|---|
| 3,025,131 | 3/1962 | Lerner | 423—62 X |
| 2,920,936 | 1/1960 | Dille et al. | 423—68 X |
| 2,255,059 | 9/1941 | Houdry | 423—62 |
| 3,235,328 | 2/1966 | Lerner et al. | 423—68 |

HERBERT T. CARTER, Primary Examiner

U.S. Cl. X.R.

423—63